(12) United States Patent
Fujishiro et al.

(10) Patent No.: US 10,518,669 B2
(45) Date of Patent: Dec. 31, 2019

(54) VEHICLE SEAT

(71) Applicant: TOYOTA BOSHOKU KABUSHIKI KAISHA, Aichi (JP)

(72) Inventors: Shun Fujishiro, Aichi (JP); Shinya Isobe, Aichi (JP); Kazuhito Fukui, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 184 days.

(21) Appl. No.: 15/812,322

(22) Filed: Nov. 14, 2017

(65) Prior Publication Data
US 2018/0141471 A1    May 24, 2018

(30) Foreign Application Priority Data

Nov. 21, 2016 (JP) ................... 2016-226048

(51) Int. Cl.
*B60N 2/20* (2006.01)
*B60N 2/02* (2006.01)
*B60N 2/68* (2006.01)
*F16H 1/32* (2006.01)

(52) U.S. Cl.
CPC ............. *B60N 2/20* (2013.01); *B60N 2/0232* (2013.01); *B60N 2/68* (2013.01); *B60N 2002/0236* (2013.01); *F16H 1/32* (2013.01)

(58) Field of Classification Search
CPC . B60N 2/20; B60N 2/0232; B60N 2002/0236
See application file for complete search history.

(56) References Cited

U.S. PATENT DOCUMENTS

| | | | | |
|---|---|---|---|---|
| 4,294,488 A | * | 10/1981 | Pickles | B60N 2/433 297/367 R |
| 4,457,557 A | * | 7/1984 | Une | B60N 2/2252 297/362 |
| 4,521,055 A | * | 6/1985 | Fudala | B60N 2/0232 297/330 |
| 5,383,710 A | * | 1/1995 | Premji | B60N 2/20 297/367 R |
| 5,390,980 A | * | 2/1995 | Premji | B60N 2/20 297/378.11 |
| 5,507,561 A | * | 4/1996 | Fourrey | B60N 2/20 297/378.1 |

(Continued)

FOREIGN PATENT DOCUMENTS

JP     2009-201783     9/2009

*Primary Examiner* — Gary C Hoge
(74) *Attorney, Agent, or Firm* — Greenblum & Bernstein, P.L.C.

(57) ABSTRACT

Provided is a vehicle seat. In the vehicle seat, a tilting member transmits a pivoting force to a back frame. An engagement member is coupled to the back frame, and allows transmission of the pivoting force to the back frame when the engagement member is in the engaged position. A recliner comprises an output gear that moves integrally with the tilting member. An amount of elastic deformation of a fold down spring increases when the back frame pivots in a rearward direction. A first anchoring member is a member that is fixed to the back frame and to which a first end of the fold down spring is anchored. A second anchoring member is a member to which a second end of the fold down spring is anchored and that moves integrally with the output gear.

6 Claims, 11 Drawing Sheets

(56) References Cited

U.S. PATENT DOCUMENTS

| | | | | |
|---|---|---|---|---|
| 5,690,386 A * | 11/1997 | Chabanne | B60N 2/688 | 297/367 R |
| 5,707,111 A * | 1/1998 | Kim | B60N 2/20 | 297/378.1 |
| 6,161,899 A * | 12/2000 | Yu | B60N 2/01583 | 297/378.12 |
| 6,328,381 B1 * | 12/2001 | Smuk | B60N 2/20 | 297/365 |
| 2002/0043853 A1 * | 4/2002 | Shephard | B60N 2/20 | 297/367 R |
| 2003/0011230 A1 * | 1/2003 | Haglund | B60N 2/20 | 297/367 R |
| 2003/0197410 A1 * | 10/2003 | Blair | B60N 2/0705 | 297/378.12 |
| 2004/0036339 A1 * | 2/2004 | Christoffel | B60N 2/20 | 297/367 R |
| 2006/0012232 A1 * | 1/2006 | Coughlin | B60N 2/20 | 297/367 R |
| 2007/0029858 A1 * | 2/2007 | Grable | B60N 2/20 | 297/378.1 |
| 2007/0138854 A1 * | 6/2007 | Paing | B60N 2/20 | 297/378.12 |
| 2007/0170764 A1 * | 7/2007 | Thiel | B60N 2/2252 | 297/367 R |
| 2009/0001797 A1 * | 1/2009 | Neumann | B60N 2/123 | 297/378.12 |
| 2009/0218870 A1 | 9/2009 | Kawamura et al. | | |
| 2009/0322137 A1 * | 12/2009 | Kojima | B60N 2/0232 | 297/362 |
| 2010/0060064 A1 * | 3/2010 | Kienke | B60N 2/20 | 297/361.1 |
| 2010/0141007 A1 * | 6/2010 | Kienke | B60N 2/206 | 297/367 R |
| 2010/0194163 A1 * | 8/2010 | Cha | B60N 2/0232 | 297/362 |
| 2011/0266852 A1 * | 11/2011 | Kienke | B60N 2/20 | 297/354.1 |
| 2012/0286556 A1 * | 11/2012 | Couasnon | B60N 2/20 | 297/463.1 |
| 2013/0234489 A1 * | 9/2013 | Lehmann | B60N 2/12 | 297/366 |
| 2014/0110986 A1 * | 4/2014 | Yamaguchi | B60N 2/68 | 297/378.1 |

* cited by examiner

VEHICLE SEAT

CROSS-REFERENCE TO RELATED APPLICATIONS

This application claims the benefit of Japanese Patent Application No. 2016-226048 filed on Nov. 21, 2016 with the Japan Patent Office, the entire disclosure of which is incorporated herein by reference.

BACKGROUND

The present disclosure relates to a vehicle seat for use in vehicles, such as automobiles, railway vehicles, ships, and airplanes.

For example, Japanese Unexamined Patent Application Publication No. 2009-201783 describes a vehicle seat in which a seatback thereof is allowed to be folded down toward a seat front side (or in a forward direction) by releasing engagement of a pawl with a ratchet plate. Being "folded down" means, for example, a state where the seatback is tilted greatly and folded in the forward direction, as compared with tilting of a seatback caused by ordinary reclining.

A "folding down" function is intended to perform, for example, a function (e.g., a "walk-in function") that improves ease of boarding/alighting to/from an area rearward of a door-side second-row seat of a minivan having three-row seats, a front passenger seat of a passenger car, or the like.

SUMMARY

In one aspect of the present disclosure, it is desirable that a vehicle seat comprise: a power reclining function to recline a seatback by an electric motor; and a "folding down" function. The vehicle seat described in Japanese Unexamined Patent Application Publication No. 2009-201783 does not comprise the power reclining function.

One aspect of the present disclosure is a vehicle seat provided with a seat cushion and a seatback pivotable in forward and rearward directions relative to the seat cushion. The vehicle seat comprises a cushion frame, a back frame, a tilting member, an engagement member, a recliner, a fold down spring, a first anchoring member, and a second anchoring member. The cushion frame forms a framework of the seat cushion. The back frame forms a framework of the seatback and is pivotable in the forward and rearward directions relative to the cushion frame. The tilting member is arranged on a pivot axis of the back frame (or on the same axis as the pivot axis of the back frame) and configured to transmit to the back frame a pivoting force to cause the back frame to pivot (for a reclining function). The tilting member is pivotable independently of the back frame (for a folding down function). The engagement member is coupled to the back frame and is displaceable between an engaged position and an unengaged position. The engaged position is a position in which the engagement member is engaged with the tilting member, and the unengaged position is a position in which the engagement member is released from engagement. The engagement member allows transmission of the pivoting force to the back frame when the engagement member is in the engaged position. The recliner performs a function of decelerating rotation of an electric motor and transmitting decelerated rotation to the tilting member. The recliner comprises an output gear that moves integrally with the tilting member. The fold down spring provides an elastic force to cause the back frame to pivot in the forward direction to a fold down position. An amount of elastic deformation of the fold down spring increases when the back frame pivots in the rearward direction. The first anchoring member is a member that is fixed to the back frame and to which a first end of the fold down spring is anchored. The second anchoring member is a member to which a second end of the fold down spring is anchored and that moves integrally with the output gear.

In such a configuration, when the tilting member and the engagement member are put in an unengaged state, the seatback is pivoted into a folded down position by the elastic force of the fold down spring. Hereat, the fold down spring provides the elastic force to cause the back frame to pivot in the forward direction, whereby the seatback can be folded down easily.

The amount of elastic deformation of the fold down spring increases when the back frame pivots in the rearward direction. This makes it possible to reduce the speed of displacement of the seatback when the seatback in the "folded down" state is pressed in the rearward direction by an occupant or others to cause the seatback to return to a standing state, that is, when the tilting member and the engagement member are engaged with each other.

Accordingly, impact at the time of engagement between the tilting member and the engagement member can be alleviated, and thus, it may be possible to reduce large vibrations of an upper end side of the seatback when the seatback returns to the standing state.

When the tilting member and the engagement member are in an engaged state, upon output of a rotational force from the electric motor, the back frame, or the seatback, pivots (is reclined) correspondingly in the forward and rearward directions.

Hereat, since the first anchoring member and the second anchoring member are displaced integrally with the back frame, a relative position of the second anchoring member with respect to the first anchoring member does not change when the back frame pivots. Accordingly, the amount of elastic deformation of the fold down spring does not change when the seatback pivots during reclining.

In contrast, in a case of a configuration in which the second end of the fold down spring is anchored directly or indirectly to the cushion frame, only the first anchoring member is displaced together with the back frame, and the second anchoring member is not displaced.

Thus, since the relative position of the second anchoring member with respect to the first anchoring member changes according to the pivotal displacement of the back frame, the amount of elastic deformation of the fold down spring changes according to the pivotal displacement of the seatback during reclining.

That is, when the amount of elastic deformation of the fold down spring increases during reclining, a large load acts on the gears and the electric motor constituting the recliner, resulting in a risk that abnormal noise is generated from the recliner and so on.

However, in the vehicle seat of the present disclosure, the amount of elastic deformation of the fold down spring does not change when the seatback pivots during reclining, and thus, no large load acts on the recliner and so on, and generation of abnormal noise from the recliner and so on can be inhibited.

In one aspect of the present disclosure, the second anchoring member may be fixed to the tilting member.

In one aspect of the present disclosure, the fold down spring may be a spiral spring. An outer peripheral end of the fold down spring may be anchored to the first anchoring member, and an inner peripheral end of the fold down spring may be anchored to the second anchoring member.

One aspect of the present disclosure may further comprise a rod arranged on the pivot axis of the back frame (or on the same axis as the pivot axis of the back frame) and configured to transmit the rotation of the electric motor to the recliner. If the second anchoring member is a cylindrical member including a through-hole through which the rod penetrates, a gap may be arranged between an inner circumferential surface of a portion where the through-hole is formed in the second anchoring member and the rod.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

Figure 1:
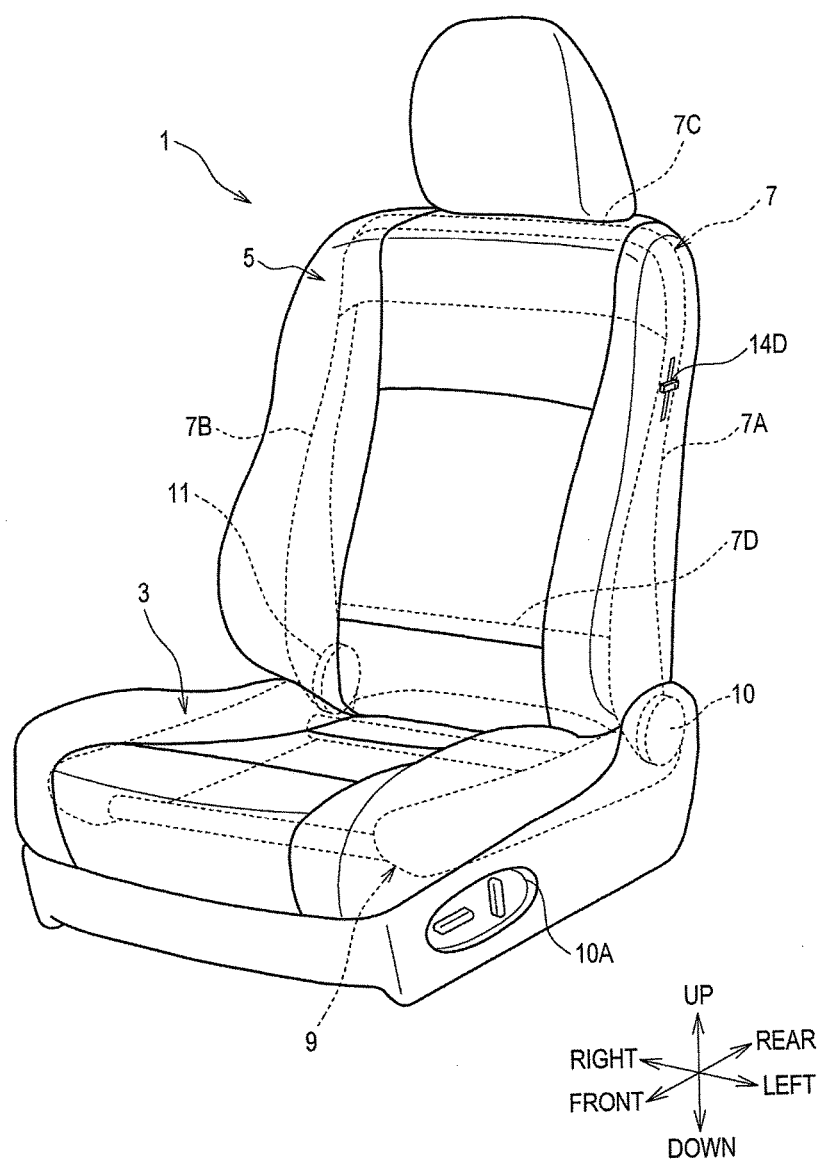
FIG. 1 is an external perspective view of a vehicle seat of an embodiment.

"Embodiments" described hereinafter are example embodiments within the technical scope of the present disclosure. In other words, matters specifying the invention, and so on, recited in the accompanying claims are not limited to specific configurations, structures, and the like, shown in the embodiments herein.

Arrows indicating directions shown in the figures are provided for the purpose of easy understanding of mutual relationships of the figures, and the arrows (directions) shown in the figures are not to limit the scope of the present disclosure.

A member or portion described with a reference numeral is at least one in number unless there is a specifying term, such as "only one". In other words, two or more members or portions may be provided unless there is a specifying term, such as "only one"

Embodiment

In the present embodiment, a front seat of a vehicle will be described. Directions in the descriptions below mean directions in a state where a vehicle seat of the present embodiment is mounted to a vehicle.

1. Overview of Vehicle Seat

As shown in FIG. 1, a vehicle seat 1 comprises a seat cushion 3 and a seatback 5. The seat cushion 3 is a portion to support an occupant's buttocks and other regions. The seatback 5 is a portion to support an occupant's back, and is pivotable (reclinable) with respect to the seat cushion 3 in seat front and rear directions (hereinafter referred to as forward and rearward directions).

The seatback 5 of the present embodiment can be folded down in the forward direction. The term "folded down" means, for example, a state where the seatback 5 is tilted greatly and folded in the forward direction, as compared with tilting of a seatback caused by ordinary reclining.

A back frame 7 is a frame that forms a framework of the seatback 5, and is pivotably coupled to a cushion frame 9. The cushion frame 9 is a frame that forms a framework to support the seat cushion 3.

The back frame 7 comprises a left side frame 7A, a right side frame 7B, an upper panel 7C, a lower panel 7D, and so on. The side frames 7A, 7B are frames that extend substantially in up and down directions and that are arranged at both sides of the back frame 7 in a seat width direction. The seat width direction corresponds to a right-left direction of the vehicle in the present embodiment.

The upper panel 7C is a frame portion that extends in the seat width direction and that couples respective upper end sides of the side frames 7A, 7B. The lower panel 7D is a frame portion that extends in the seat width direction and that couples respective lower end sides of the side frames 7A, 7B.

A left recliner 10 and a right recliner 11 are provided on sides of the back frame 7 in the seat width direction, that is, to the side frames 7A, 7B, respectively. The two recliners 10, 11 form a mechanism to perform a function (hereinafter referred to as a "reclining function") to restrict pivoting (reclining) of the seatback 5, that is, of the back frame 7, and also a mechanism to perform a folding down function. This folding down function may be performed by a single recliner, but using two recliners is preferred.

2. Configurations of Recliners

The left recliner 10 and the right recliner 11 have similar configurations and may be mirror images of each other. The configurations of the recliners 10, 11 will be described hereinafter taking the left recliner 10 (located to the left in the present embodiment) as an example.

Figure 2:
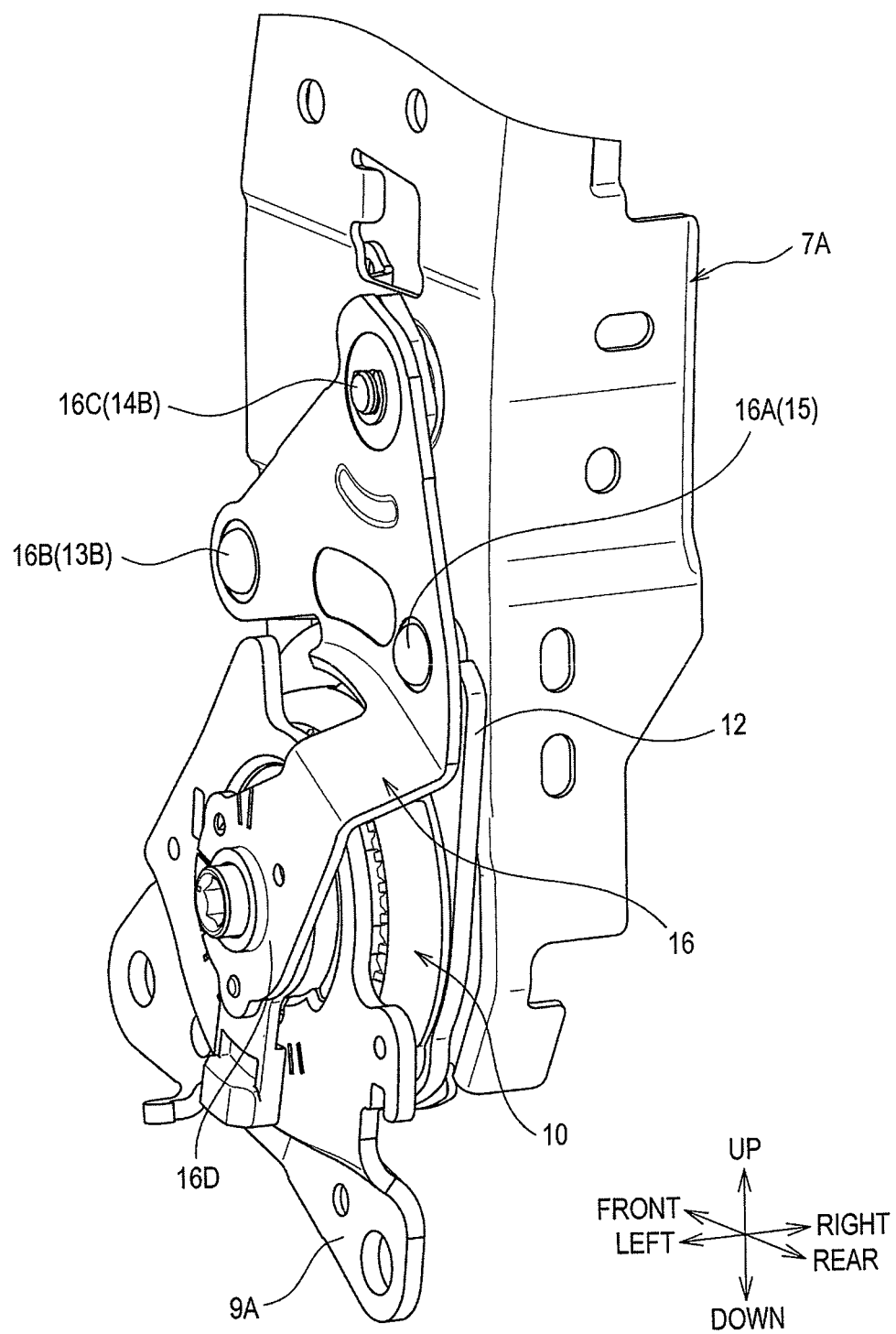
FIG. 2 is an external view of a recliner of the embodiment.
Figure 3:
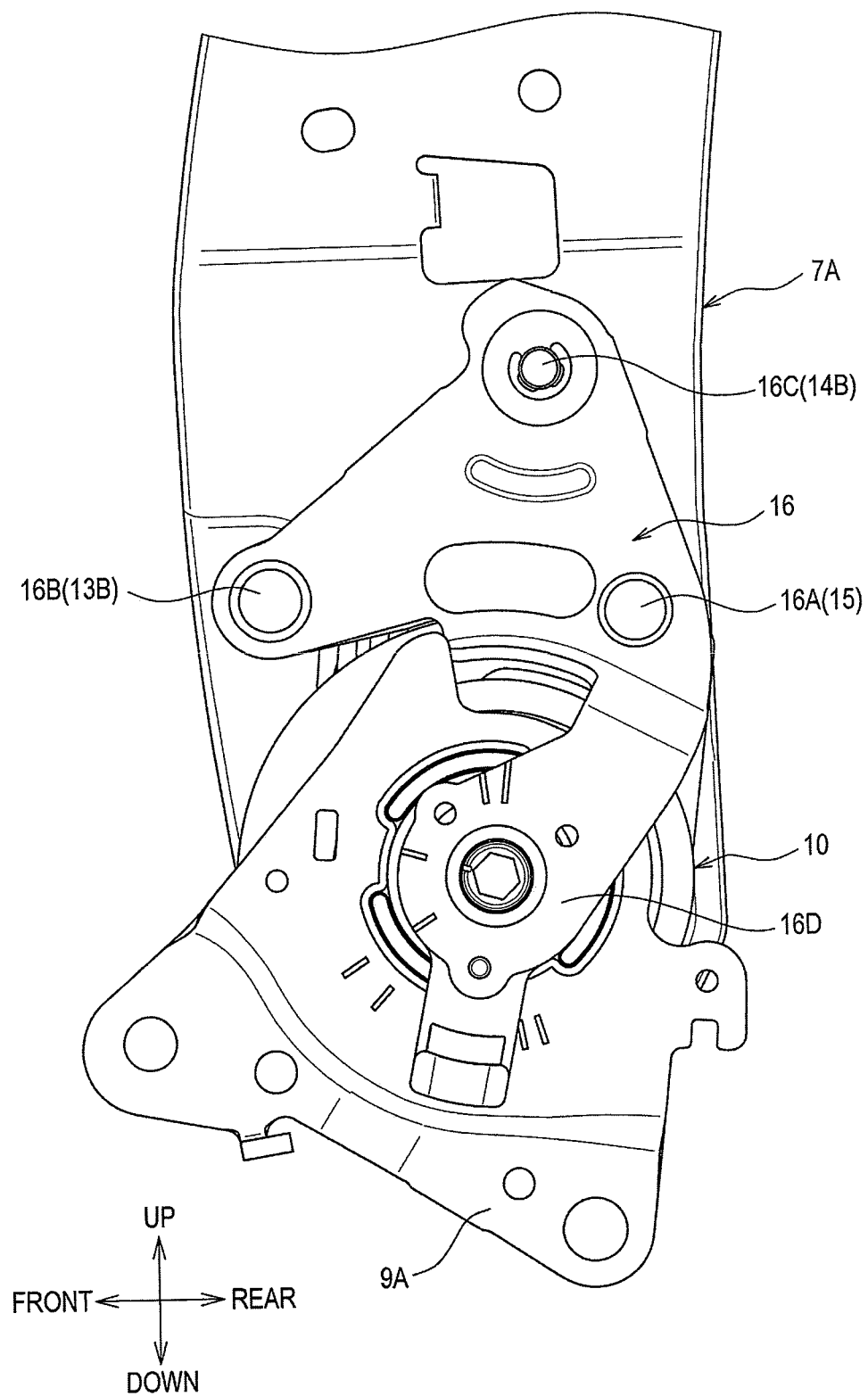
FIG. 3 is an external view of the recliner of the embodiment.

The left recliner 10 is mounted on a lower end side of an outer side of the left side frame 7A (see FIGS. 2 and 3). The outer side of the left side frame 7A means a side of the left side frame 7A opposite the right side frame 7B in a seat width direction.

An inner side of the left side frame 7A means a side opposite the outer side of the left side frame 7A in the seat width direction, that is, a side of the left side frame 7A closer to the right side frame 7B in the seat width direction. The right recliner 11 is mounted on a lower end side of an outer side of the right side frame 7B.

The reclining function is performed by an angle position adjusting mechanism 20 powered electrically. The angle position adjusting mechanism 20 is a mechanism similar to, for example, an angle position adjusting mechanism described in Japanese Patent No. 4029847.

Figure 5:
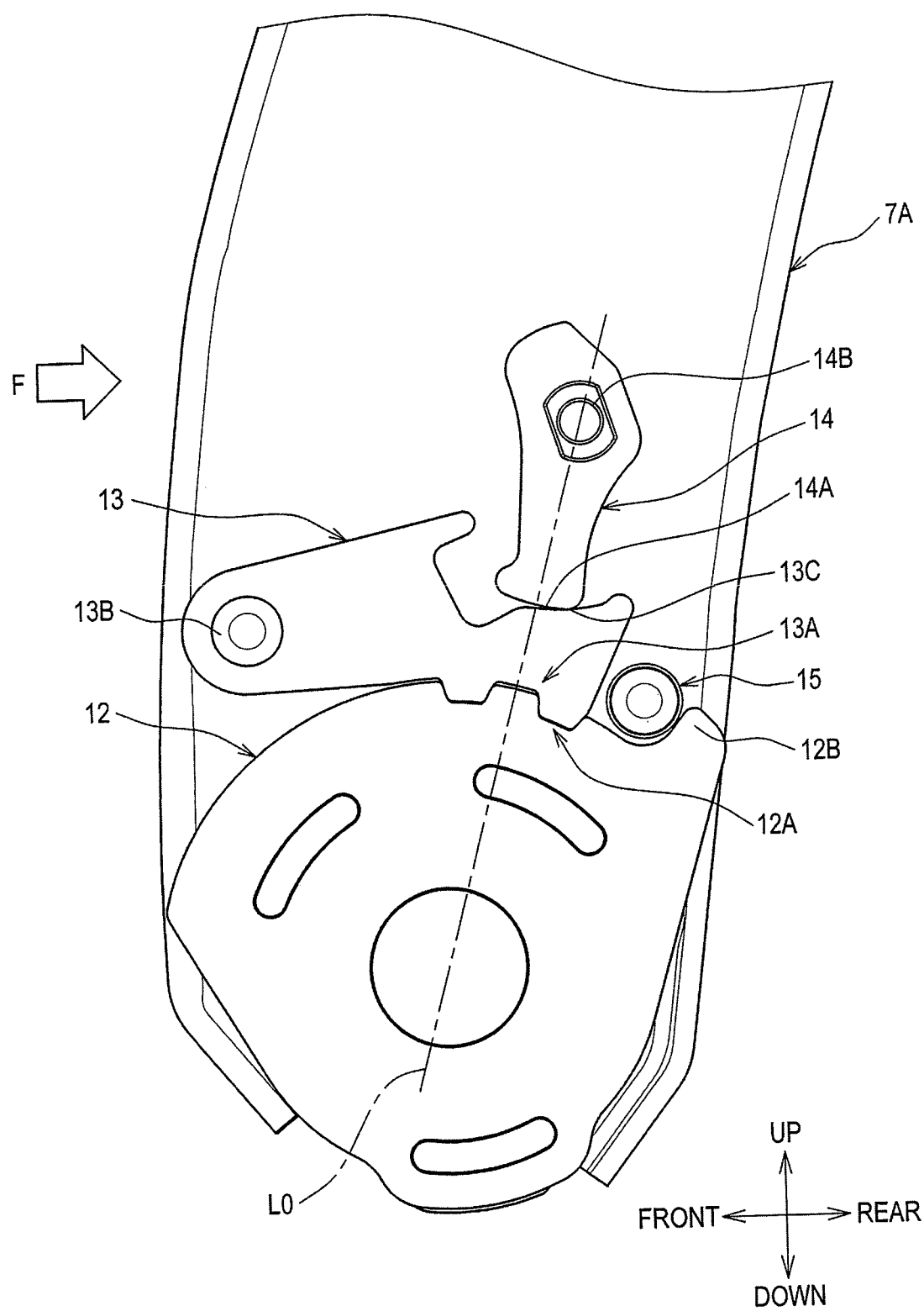
FIG. 5 is a view showing a feature of the recliner of the embodiment.

As shown in FIG. 5, the folding down function is performed by at least a tilting member 12, an engagement member 13, and a locking member 14. During the folding down function, the engagement member 13 is released from the tilting member 12, and the left side frame 7A folds down easily, powered by a fold down spring 30 (see FIG. 7). Regarding the reclining function, the angle position adjusting mechanism 20 rotates the tilting member 12, and the tilting member 12 transmits to the left side frame 7A a force (hereinafter referred to as a pivoting force) to cause the back frame 7 to pivot (recline). The tilting member 12 is commonly also referred to as a ratchet plate or a rotation cam.

Figure 4:
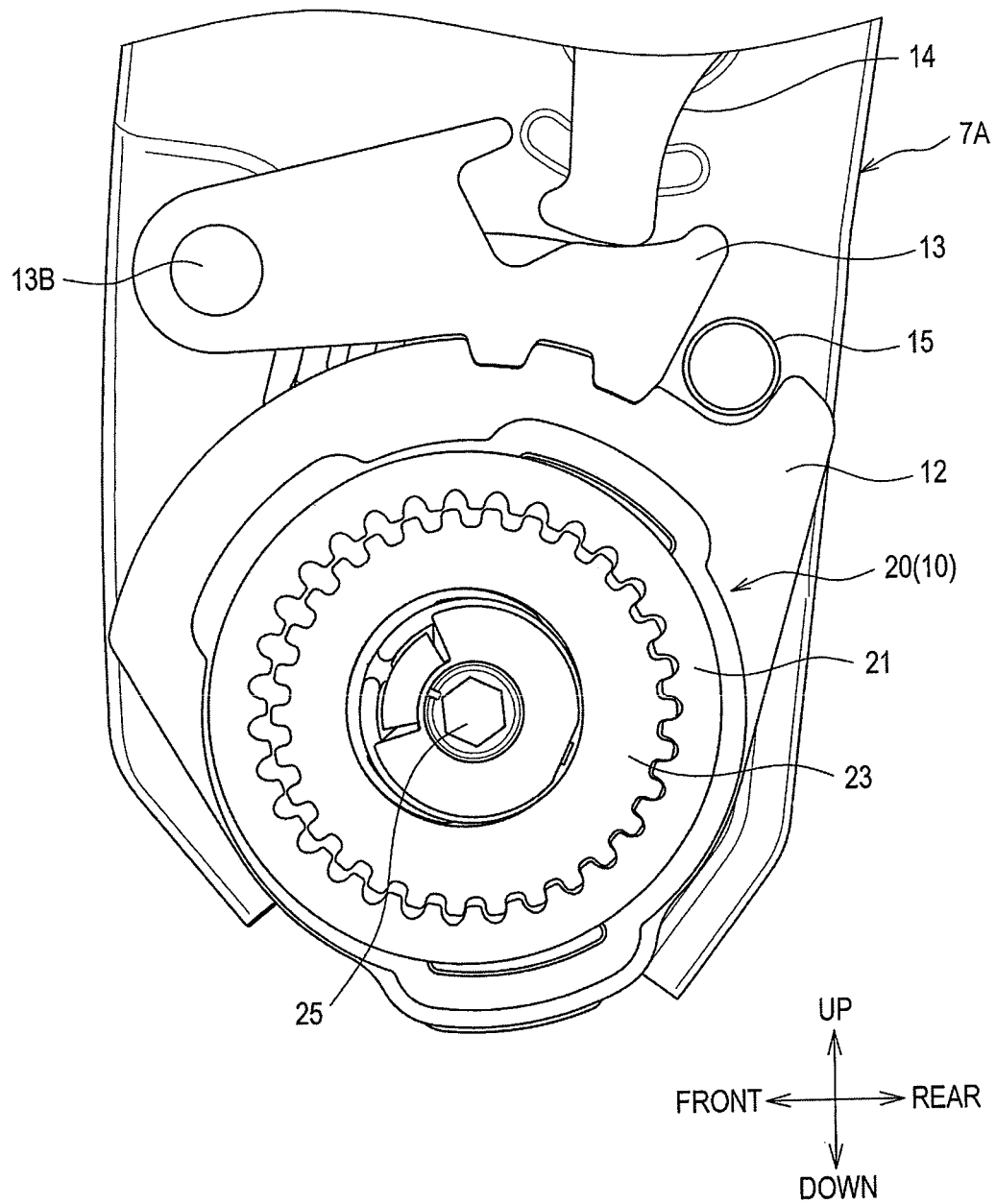
FIG. 4 is an explanatory view of an angle position adjusting mechanism of the embodiment.

As shown in FIG. 4, the angle position adjusting mechanism 20 is configured with an internally toothed gear 21 and an externally toothed gear 23. The internally toothed gear 21 is an annular gear (ring gear) having tooth tops protruding toward the center of the internally toothed gear 21. The internally toothed gear 21 is fixed directly or indirectly to the cushion frame 9 via a lower arm 9A (see FIG. 2).

The externally toothed gear 23 is a gear having tooth tops protruding outwardly in a radial direction. The externally toothed gear 23 revolves within the internally toothed gear 21 while rotating engaged with the internally toothed gear 21. That is, the externally toothed gear 23 is a planetary gear that rotates about its own center as the external center of rotation, while allowing the internally toothed gear 21 to rotate about its own center as the internal center of revolution.

The externally toothed gear 23 rotates by receiving a rotational force from an electric motor (not shown) via a coupling rod 25. Hereat, assuming that the number of teeth of the externally toothed gear 23 is Z1 and that the number of teeth of the internally toothed gear 21 is Z2 (>Z1), when the externally toothed gear 23 rotates n times, the externally toothed gear 23 revolves (Z2−Z1)/Z2×n times.

Thus, each time the externally toothed gear 23 makes one rotation, the center of rotation of the externally toothed gear 23 shifts in a revolution direction with respect to the original position. Specifically, each time the externally toothed gear 23 makes one rotation, the center of rotation of the externally toothed gear 23 shifts by 360−[(Z2−Z1)/Z2×360] degrees in the revolution direction.

The externally toothed gear 23 is integrally fixed to the tilting member 12 by fixing means such as welding. Thus, when the electric motor (the coupling rod 25) rotates, the coupling rod 25 drives the internally toothed gear 21, which drives the externally toothed gear 23 in the revolution direction, to thereby cause the tilting member 12 to recline or pivot in the revolution direction.

That is, the force to shift the externally toothed gear 23 in the revolution direction becomes the above-described "pivoting force" or "reclining force". In other words, the left recliner 10 performs a function of decelerating the rotation of the electric motor and transmitting the decelerated rotation to the tilting member 12, and the externally toothed gear 23 functions as an output gear of the left recliner 10 forming a deceleration mechanism.

The tilting member 12 is coupled to the left side frame 7A so as to be pivotable relative to the left side frame 7A (during the folding down function, when not engaged to the engagement member 13). Additionally, the tilting member 12 and the left side frame 7A (part of the back frame 7) are pivotable relative to the cushion frame 9 when the angle position adjusting mechanism 20 operates (during the reclining function).

Figure 6:
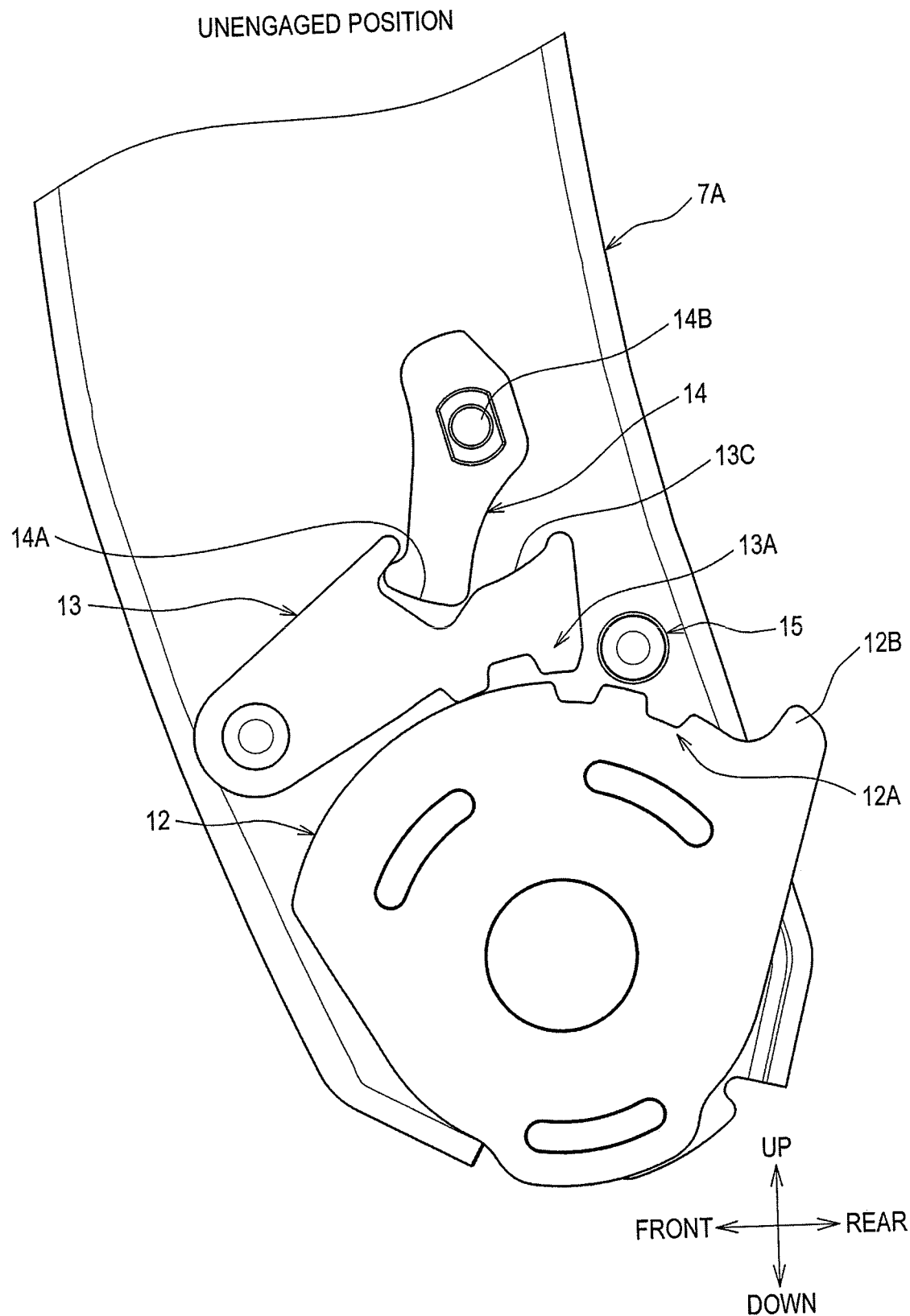
FIG. 6 is a view showing a feature of the recliner of the embodiment.

The engagement member 13 is displaceably coupled to the back frame 7 (the left side frame 7A in the present embodiment), and is displaceable between an engaged position (see FIG. 5 in which engagement with the tilting member 12 is established) and an unengaged position (see FIG. 6 in which the engagement is released). The engagement member 13 is commonly also referred to as a pawl. The unengaged position allows the left side frame 7A to fold down independently of the tilting member 12.

Specifically, as shown in FIG. 5, the engagement member 13 extends above the tilting member 12 in the forward and rearward directions adjacent to a vertical surface of the left side frame 7A. A forward portion of the engagement member 13 is pivotably coupled to the left side frame 7A using a second coupling pin 13B.

The engagement member 13 comprises, on a rear portion thereof, an engagement portion 13A to engage with an engagement target portion 12A of the tilting member 12. The engagement target portion 12A and the engagement portion 13A each have a concave-convex shape. The engagement target portion 12A and the engagement portion 13A are engaged with each other when the engagement target portion 12A and the engagement portion 13A are fitted together in an intermeshing manner, as shown in FIG. 5.

When the engagement target portion 12A and the engagement portion 13A are in an engaged state, the pivoting force (or reclining force) transmitted to the tilting member 12 is transmitted to the left side frame 7A. Thus, if the externally toothed gear 23 revolves when the engagement member 13 is in the engaged position, then the tilting member 12 and the back frame 7, as a single member, pivot relative to the cushion frame 9 during the reclining function due to the electric motor.

When the engagement target portion 12A and the engagement portion 13A are in an unengaged state, the pivoting force (or reclining force) cannot be transmitted to the left side frame 7A, and the left side frame 7A is pivotable relative to the tilting member 12. Thus, when the engagement member 13 is in the unengaged position, the left side frame 7A is pivotable (or can be folded down) relative to the cushion frame 9 during the folding down function.

The locking member 14 is displaceable between a locking position for holding the engagement member 13 in the engaged position and a position other than the locking position (hereinafter referred to as a non-locking position). The locking member 14 of the present embodiment extends above the engagement portion 13A substantially in the up and down directions along a left side surface of the left side frame 7A.

The locking member 14 is pivotably coupled, at an upper end side thereof, to the left side frame 7A through a first coupling pin 14B. The locking member 14 comprises, on a lower end side thereof, a cam portion 14A that slidingly contacts a sliding contact portion 13C of the engagement member 13.

As shown in FIG. 5, when the locking member 14 is in the locking position, an extending direction of the locking member 14 is substantially coaxial with a virtual line L0. The virtual line L0 passes through the pivot center of the locking member 14 and the pivot center of the tilting member 12.

Figure 7:
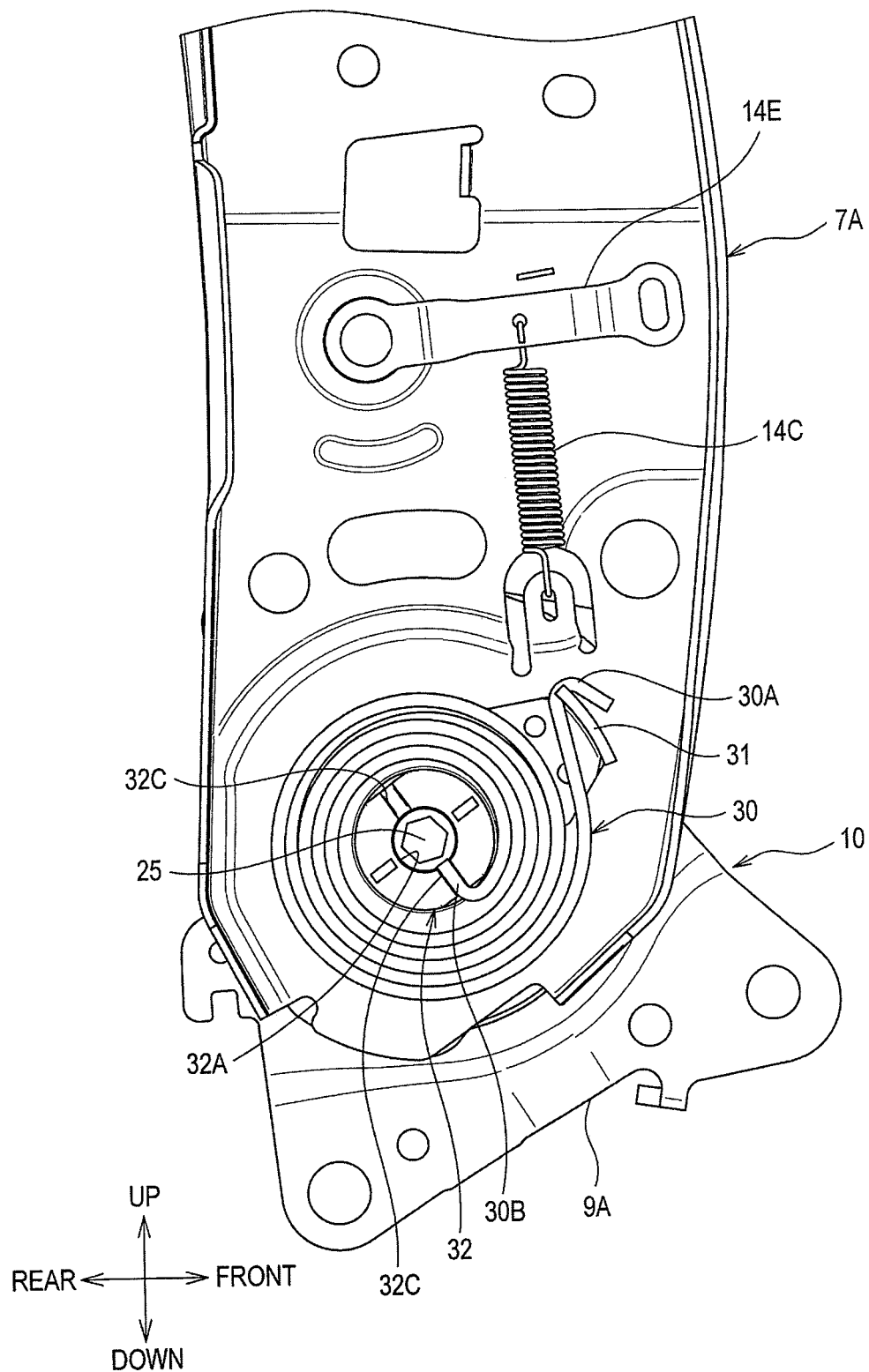
FIG. 7 is a view showing a reverse side of FIG. 5.
Figure 8:
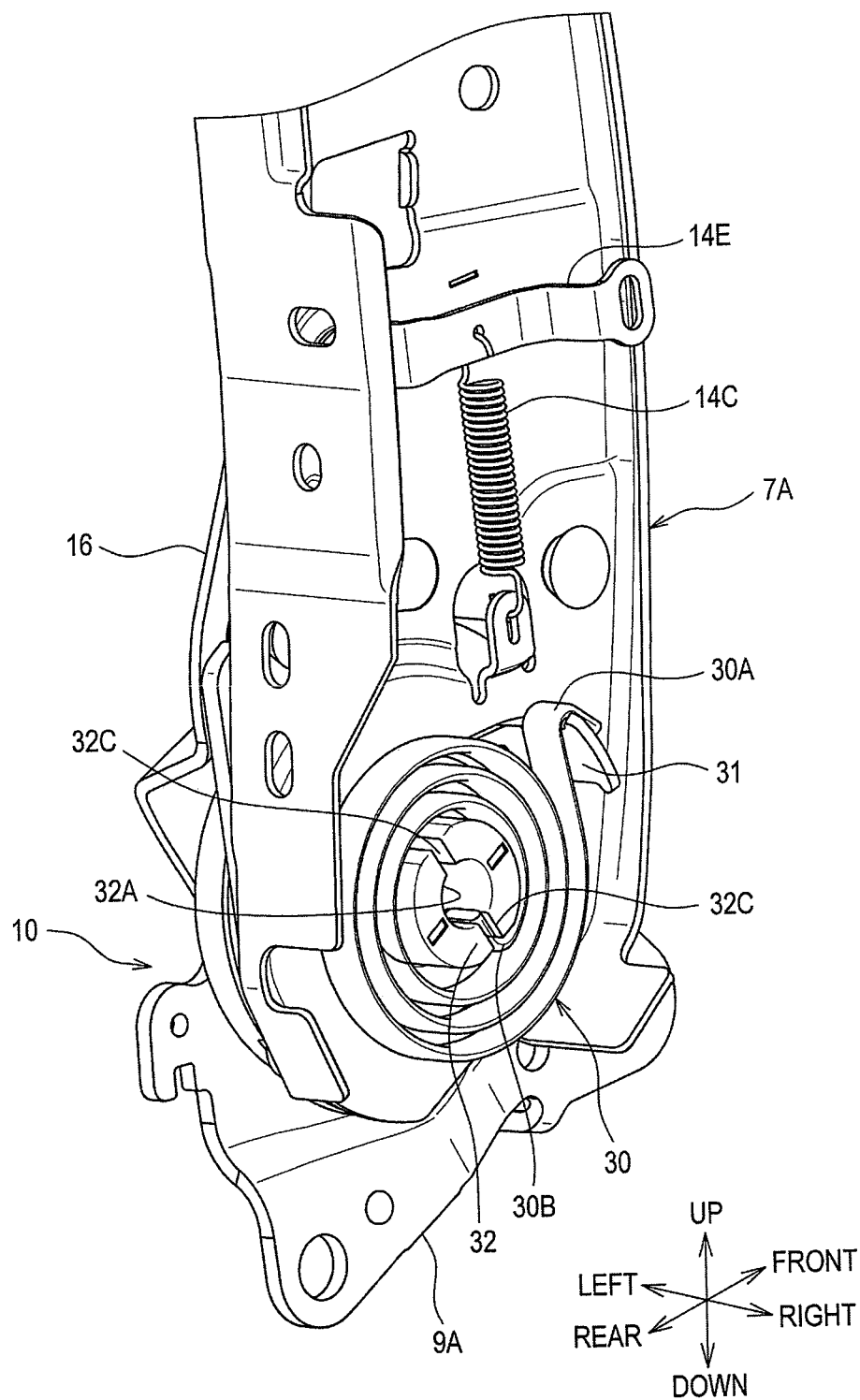
FIG. 8 is a perspective view showing the reverse side of FIG. 5.

As shown in FIGS. 7 and 8, a locking spring 14C and an upper arm 14E are provided on a side opposite the locking member 14 with the left side frame 7A therebetween, that is, on a part of the left side frame 7A facing the right side frame 7B. In other words, the locking spring 14C and the upper arm 14E are provided on an internal side or a right side of the left side frame 7A.

The locking spring 14C provides an elastic force to hold the locking member 14 in the locking position through the upper arm 14E. Coupled to a leading end side of the upper arm 14E is a first end of a wire, such as a control cable.

A second end of the wire is coupled to a walk-in lever 14D (see FIG. 1). Thus, a user, such as an occupant, can displace the locking member 14 to the non-locking position by operating the walk-in lever 14D.

The left recliner 10 comprises an un-engagement spring (not shown) to hold the engagement member 13 in the unengaged position. Thus, when the locking member 14 is displaced to the non-locking position, an elastic force of the un-engagement spring causes the engagement member 13 to be displaced to the unengaged position. Then, when the locking member 14 returns from the non-locking position to the locking position, the locking member 14 causes the engagement member 13 to be displaced from the unengaged position to the engaged position.

Figure 11:
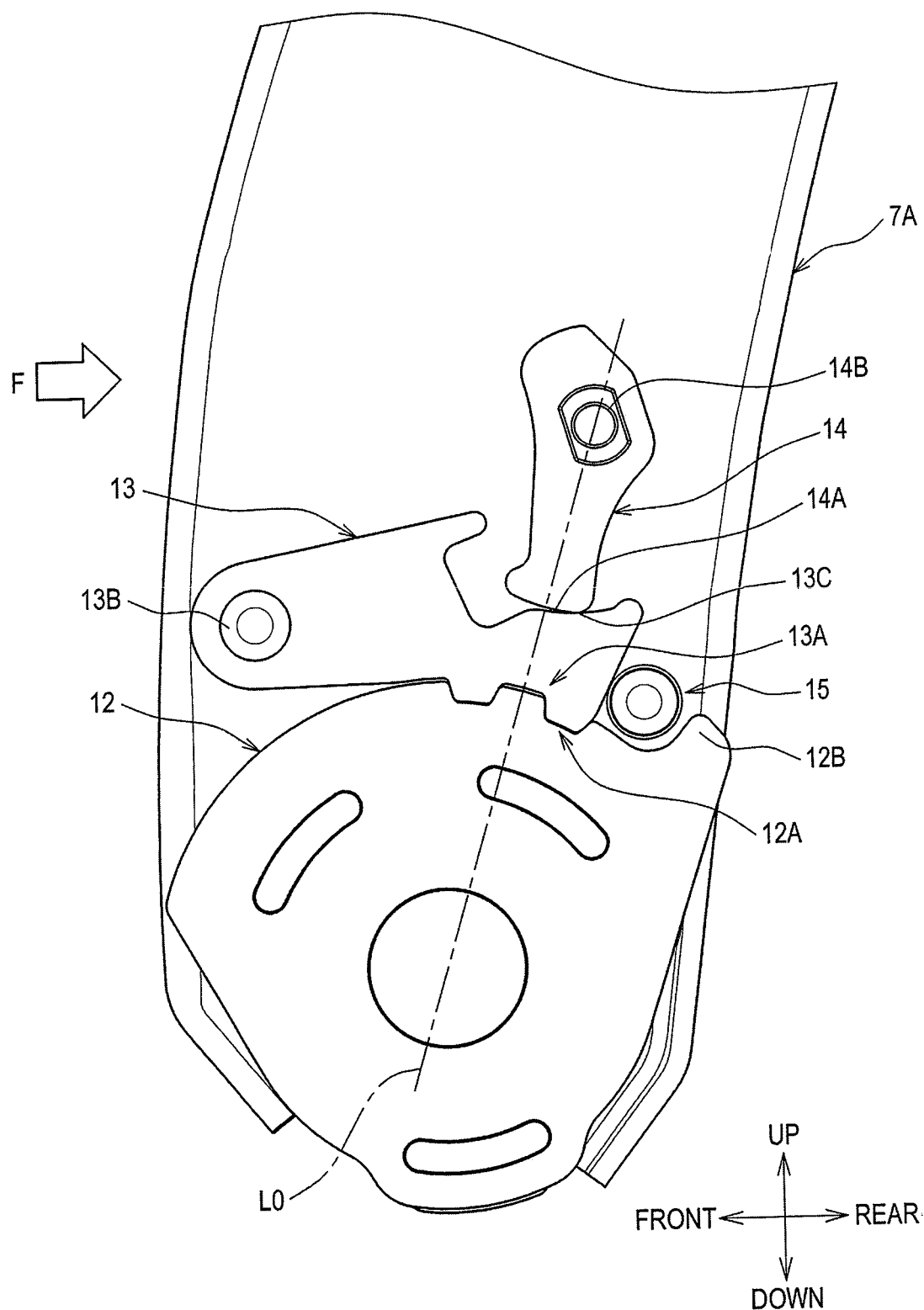
FIG. 11 is an explanatory view showing the feature of the recliner of the embodiment.

A stopper 15 shown in FIG. 11 is fixed to the back frame 7 (the left side frame 7A in the present embodiment) and is capable of receiving, via the engagement member 13, an external force F that acts on the engagement member 13 positioned in the engaged position.

Specifically, the external force F is a force that acts on the engagement member 13 via the seatback 5 (the back frame 7) and that is directed rearward from the front of the seat. The stopper 15 of the present embodiment is a columnar or cylindrical pin member. The stopper 15 is arranged rearward of the engagement member 13 positioned in the engaged position.

In a case where no external force F acts on the engagement member 13 when the engagement member 13 is in the engaged position, the stopper 15 and the engagement member 13 are spaced apart from each other with a gap or an elastic member, such as rubber therebetween. FIG. 5 illustrates this gap.

The tilting member 12 comprises an abutment portion 12B provided rearward of the stopper 15. The abutment portion 12B abuts the stopper 15 when the back frame 7 pivots in the rearward direction. See FIG. 5.

Specifically, when the engagement member 13 is in the unengaged position, the back frame 7 is pivotable in the forward and rearward directions relative to the tilting member 12. The abutment portion 12B restricts the back frame 7 that is in a pivotable state from pivoting beyond a specified state in the rearward direction relative to the tilting member 12, and aligns the engagement portion 13A of the engagement member 13 with the engagement target portion 12A of the tilting member 12. This alignment facilitates smooth (and automatic) engagement as the locking spring 14C rotates the locking member 14 down into a locking position, which pushes the engagement member 13 into an engaged position.

When the engagement member 13 is in the engaged position, the engagement member 13 is located forward of the stopper 15, and the abutment portion 12B is located rearward of the stopper 15. That is, the stopper 15 is located between the engagement member 13 and the abutment portion 12B in a front-rear direction.

As shown in FIG. 2, a restriction member 16 covers the locking member 14 and the engagement member 13, and restricts displacement of the locking member 14 and the engagement member 13 in the seat width direction.

Specifically, the left side frame 7A is located rightward of the locking member 14 and the engagement member 13 in the seat width direction, and the restriction member 16 is located leftward of the locking member 14 and the engagement member 13 in the seat width direction. Thus, the locking member 14 and the engagement member 13 are held between the left side frame 7A and the restriction member 16 in the seat width direction, and are restricted from being displaced in the seat width direction.

The restriction member 16 is fixed to the left side frame 7A at a plurality of places (a first fixing portion 16A, a second fixing portion 16B, and a third fixing portion 16C in the present embodiment of FIG. 2). The first fixing portion 16A is fixed to the left side frame 7A through the stopper 15.

The second fixing portion 16B is fixed to the left side frame 7A through the second coupling pin 13B. The first fixing portion 16A and the second fixing portion 16B are fixed by caulking to the stopper 15 and the second coupling pin 13B, respectively.

The third fixing portion 16C is fixed to the left side frame 7A through the first coupling pin 14B. The third fixing portion 16C is fixed to the first coupling pin 14B with a snap ring, such as an E-type retaining ring. The restriction member 16 also comprises a lower arm 16D extending toward the pivot center of the tilting member 12.

As shown in FIGS. 7 and 8, the fold down spring 30 is provided on a side of the left side frame 7A opposite the right side frame 7B. The fold down spring 30 provides an elastic force to cause the back frame 7 to pivot in the forward direction (during the folding down function), and is configured such that an amount of elastic deformation increases when the back frame 7 pivots in the rearward direction.

The fold down spring 30 of the present embodiment is a spiral spring. An outer peripheral end 30A of the fold down spring 30 is caught in and anchored to a first anchoring member 31, and an inner peripheral end 30B of the fold down spring 30 is caught in and anchored to a second anchoring member 32.

Figure 9:
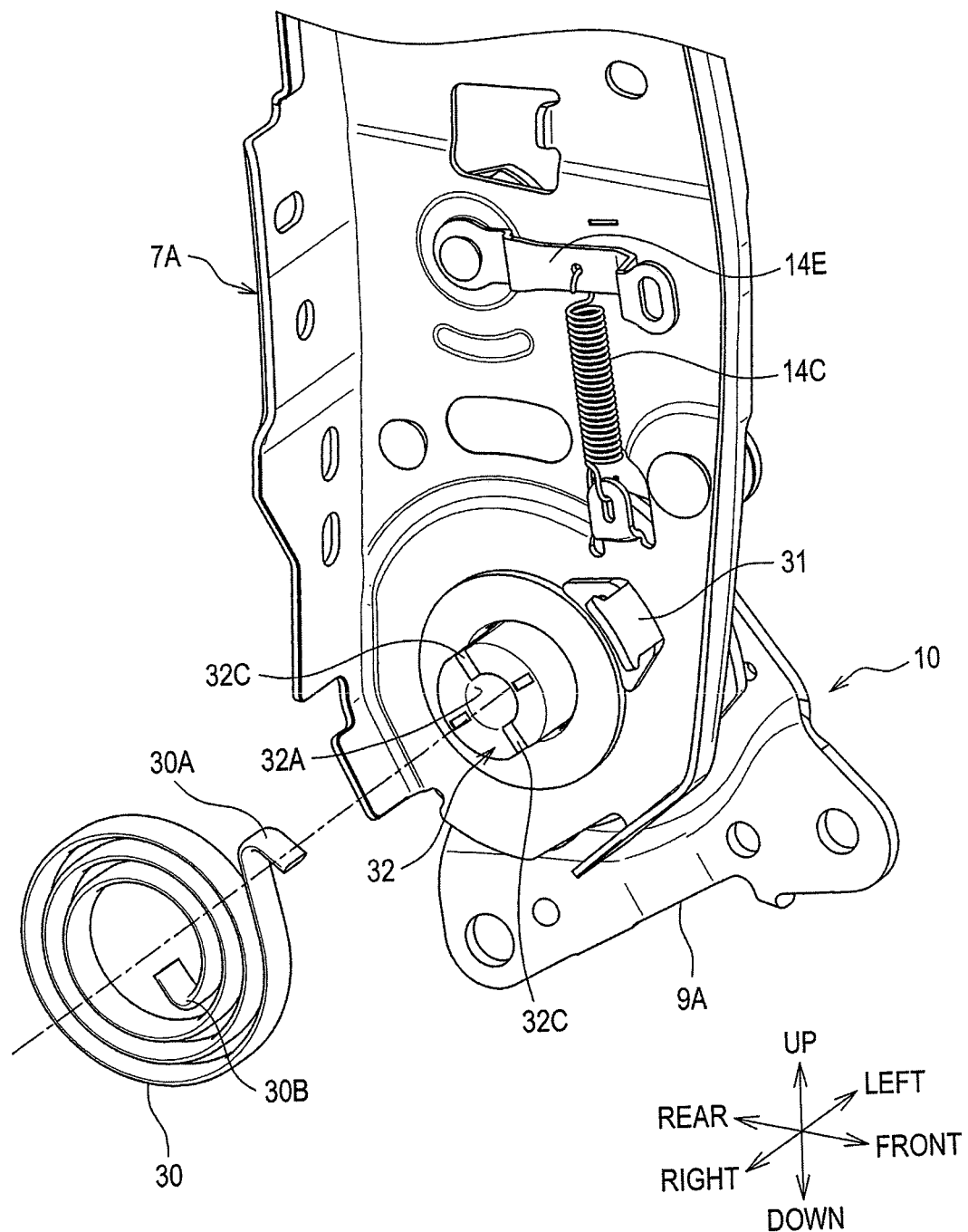
FIG. 9 is a partial exploded view of the recliner of the embodiment.

As shown in FIG. 9, the first anchoring member 31, which is fixed to the back frame 7, is a portion to which a first end of the fold down spring 30 is anchored. The first anchoring member 31 of the present embodiment is fixed to the inside of each of the left side frame 7A and the right side frame 7B by welding.

Figure 10:
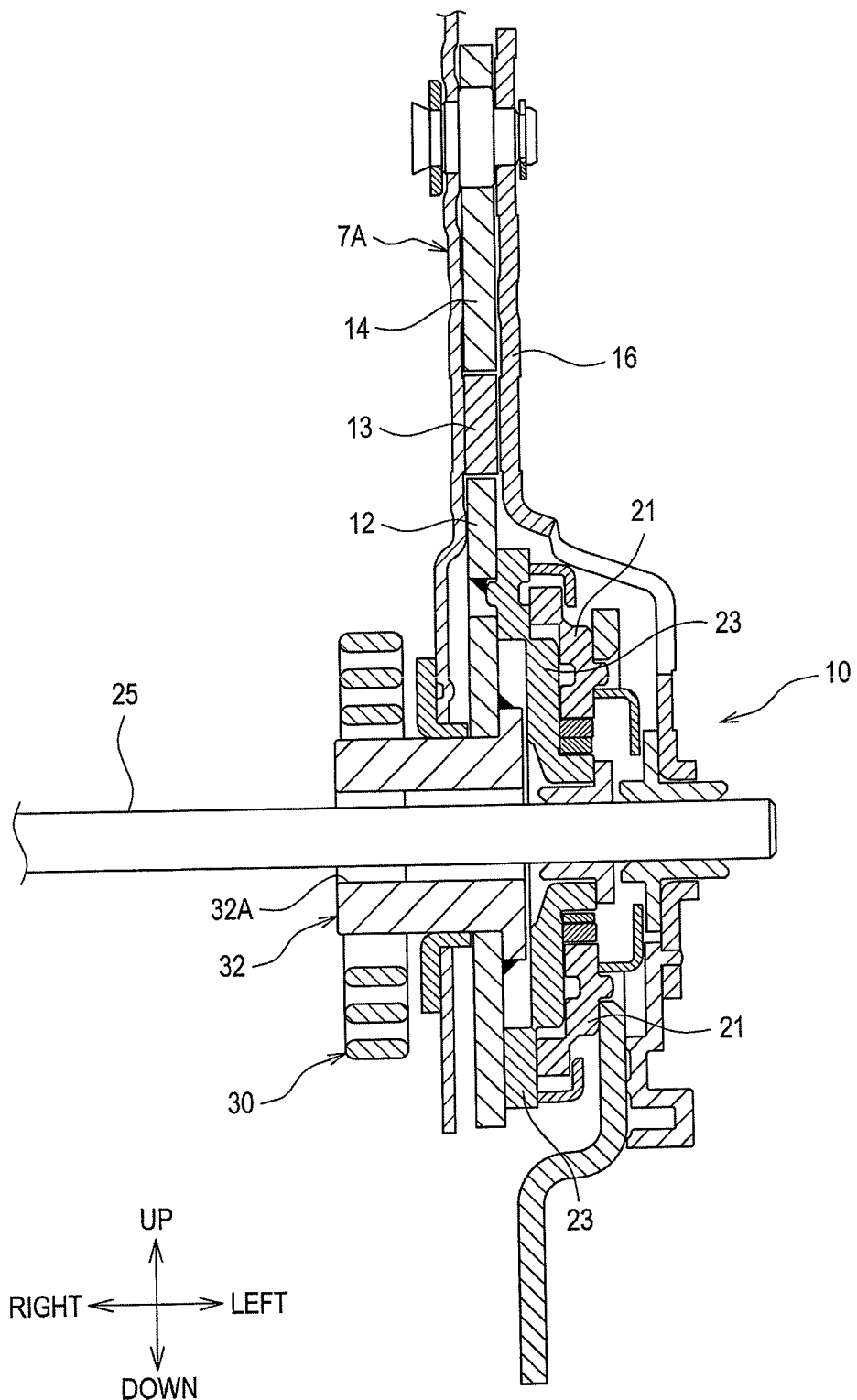
FIG. 10 is a sectional view of the recliner and so on of the embodiment.

The second anchoring member 32 is a member to which a second end of the fold down spring 30, which is opposite the first end, is anchored and that moves integrally with the externally toothed gear 23. Specifically, as shown in FIG. 10, the second anchoring member 32 is integrally fixed to the tilting member 12 by welding or the like.

The second anchoring member 32 of the present embodiment is a cylindrical member having a through-hole 32A through which the coupling rod 25 penetrates. A gap (vacant space) is arranged between an inner circumferential surface of a portion where the through-hole 32A is formed in the second anchoring member 32 and the coupling rod 25. That is, when the second anchoring member 32 rotates relative to the coupling rod 25, the inner circumferential surface of the second anchoring member 32 does not come in sliding contact with the coupling rod 25.

As shown in FIG. 7, the second anchoring member 32 comprises two portions 32C to which the inner peripheral end 30B of the fold down spring 30 is anchored. In the present embodiment, such portions 32C are positioned in a rotationally symmetric manner about the central axis of the second anchoring member 32.

3. Features of Vehicle Seat (Recliner in Particular) of the Present Embodiment

In the present embodiment, there are provided the first anchoring member 31 that is fixed to the back frame 7 and to which the first end of the fold down spring 30 is anchored; and the second anchoring member 32 to which the second end of the fold down spring 30 is anchored and that moves integrally with the externally toothed gear 23.

In such a configuration, when the tilting member 12 and the engagement member 13 are put in an unengaged state, the seatback 5 is allowed to be folded down. Hereat, the fold down spring 30 provides the elastic force to cause the back frame 7 to pivot in the forward direction, whereby the seatback 5 can be folded down easily.

The amount of elastic deformation of the fold down spring 30 increases when the back frame 7 pivots in the rearward direction. This makes it possible to reduce the speed of displacement of the seatback 5 when the seatback 5 in the "folded down" state is pressed in the rearward direction by the occupant to cause the seatback 5 to return to a standing state, that is, when the tilting member 12 and the engagement member 13 are engaged with each other.

Accordingly, impact at the time of engagement between the tilting member 12 and the engagement member 13 can be alleviated, and thus, it may be possible to reduce large vibration of an upper end side of the seatback 5 when the seatback 5 returns to the standing state.

When the tilting member 12 and the engagement member 13 are in an engaged state, upon output of the rotational force from the electric motor, the back frame 7, or the seatback 5, is reclined correspondingly in the forward and rearward directions.

Hereat, since the first anchoring member 31 and the second anchoring member 32 are displaced integrally with the back frame 7, a relative position of the second anchoring member 32 with respect to the first anchoring member 31 does not change when the back frame 7 pivots. Accordingly, the amount of elastic deformation of the fold down spring 30 does not change when the seatback 5 pivots during reclining.

In contrast, in a case of a configuration in which the second end of the fold down spring 30 is anchored directly or indirectly to the cushion frame 9, only the first anchoring member 31 is displaced together with the back frame 7, and the second anchoring member 32 is not displaced.

Thus, since the relative position of the second anchoring member 32 with respect to the first anchoring member 31 changes according to the pivotal displacement of the back frame 7, the amount of elastic deformation of the fold down spring 30 changes according to the pivotal displacement of the seatback 5 during reclining.

That is, when the amount of elastic deformation of the fold down spring 30 increases during reclining (especially during reclining back into a sleeping position), a large load acts on the gears and the electric motor constituting the recliners 10, 11, resulting in a risk that abnormal noise is generated from the recliners 10, 11 and so on.

However, in the vehicle seat 1 of the present embodiment, the amount of elastic deformation of the fold down spring 30 does not change when the seatback 5 pivots during reclining, and thus, no large load acts on the recliners 10, 11, and generation of abnormal noise from the recliners 10, 11 and so on can be inhibited.

As shown in FIG. 7, the second anchoring member 32 is the cylindrical member having the through-hole 32A through which the coupling rod 25 penetrates, and the gap is arranged between the inner circumferential surface of the second anchoring member 32 and the coupling rod 25. In such a configuration, the inner circumferential surface of the second anchoring member 32 and the coupling rod 25 do not contact each other when, for example, "folding down" is carried out, and thus, such "folding down" can be easily carried out.

In the present embodiment, when the tilting member 12 and the engagement member 13 are in the engaged state, the back frame 7 and the tilting member 12 pivot together (during the reclining function). Specifically, when the tilting member 12 and the engagement member 13 are in the engaged state, the pivoting force is allowed to be transmitted from the tilting member 12 to the back frame 7, and thus, the pivotal movement of the tilting member 12 causes the back frame 7, or the seatback 5, to pivot as well.

When the tilting member 12 and the engagement member 13 are in the unengaged state, the back frame 7 is freely pivotable without being restricted by the tilting member 12, and therefore is allowed to be "folded down" (during the folding down function).

If a large load in the rearward direction acts on the back frame 7 when the tilting member 12 and the engagement member 13 are in the engaged state, the engagement member 13 contacts the stopper 15 as shown in FIG. 11. The external force F caused by the large load in the rearward direction acts on parts where the tilting member 12 and the engagement member 13 are engaged with each other and on the stopper 15 in a distributed manner.

Accordingly, the load to be received by such engaged parts can be reduced as compared with a configuration in which the load is received only by the parts where the tilting member 12 and the engagement member 13 are engaged with each other. Thus, it may be possible to provide a vehicle seat that can withstand a large load in the rearward direction, and at the same time, reduce increase in size and weight of the tilting member 12 and the engagement member 13.

The tilting member 12 comprises the abutment portion 12B that abuts the stopper 15 when the back frame 7 pivots in the rearward direction. When the engagement member 13 is in the engaged position, the stopper 15 is located between the engagement member 13 and the abutment portion 12B in the front-rear direction.

Providing the abutment portion 12B as part of the tilting member 12 avoids the need to separately provide a regulation part to regulate excessive pivotal displacement of the back frame 7 in the rearward direction while the engagement member 13 is not engaged. Thus, complexity of configurations around the tilting member 12 can be reduced.

In the case where no external force F acts on the engagement member 13 when the engagement member 13 is in the engaged position, the stopper 15 and the engagement member 13 are spaced apart from each other. This enables secure engagement between the tilting member 12 and the engagement member 13.

Specifically, if the stopper 15 and the engagement member 13 have respective nominal values such that the stopper 15 and the engagement member 13 may contact each other, then sufficient engagement of the tilting member 12 and the engagement member 13 might not be established when dimensions of the stopper 15 and the engagement member 13 are respective upper limit values within respective tolerance ranges of their respective nominal values.

In contrast, in the present embodiment, in the case where no external force F acts on the engagement member 13 when the engagement member 13 is in the engaged position, the stopper 15 and the engagement member 13 may be spaced apart from each other (see FIG. 5). Thus, the above-described dimensional variations are absorbed to thereby enable secure engagement between the tilting member 12 and the engagement member 13.

The restriction member 16 restricts displacement of the engagement member 13 in the seat width direction. Specifically, the restriction member 16 "sandwiches" the locking member 14, the engagement member 13, and the tilting member 12 against the left side frame 7A. This securely retains the tilting member 12 and the engagement member 13 in the engaged state by preventing the engagement member 13 from slipping off of the tilting member 12 by slightly shifting or twisting.

Further, the restriction member 16 is fixed to the left side frame 7A at the plurality of places, and one of the plurality of places (i.e., the first fixing portion 16A) is fixed to the left side frame 7A through the stopper 15.

As a result, the stopper 15 is fixed to the left side frame 7A and to the restriction member 16 in a state of being held between the left side frame 7A and the restriction member 16. In other words, the stopper 15 is configured such that both ends thereof are fixed to, or supported by, the left side frame 7A and the restriction member 16, respectively. Accordingly, the stopper 15 can be firmly retained.

Other Embodiments

The fold down spring 30 of the above-described embodiment is configured as the spiral spring. However, the present disclosure is not limited to this. Specifically, the fold down spring 30 may be configured, for example, as a spring of other type, such as a coil spring or a torsion coil spring.

The second anchoring member 32 of the above-described embodiment is integrated with the externally toothed gear 23 indirectly via the tilting member 12. However, the present disclosure is not limited to this.

Specifically, the second anchoring member 32 may, for example, be integrated with the externally toothed gear 23 directly. In such a case, the second anchoring member 32 and the externally toothed gear 23 may be integrated together by welding, mechanical fasteners such as screws or rivets, or the like, or may be integrally molded.

In the above-described embodiment, a gap (vacant space) is arranged between the inner circumferential surface of the second anchoring member 32 and the coupling rod 25. However, the present disclosure is not limited to this. Specifically, a configuration may be employed in which, for example, the gap between the inner circumferential surface of the second anchoring member 32 and the coupling rod 25 is not arranged.

The stopper 15 of the above-described embodiment is preferably a columnar or cylindrical pin member. However, the present disclosure is not limited to this. Specifically, a sectional shape of the stopper 15 may be, for example, a fan-like shape or the like. Alternatively, a configuration may be employed in which the stopper 15 is not provided.

In the above-described embodiment, the abutment portion 12B is provided to the tilting member 12. However, the present disclosure is not limited to this. Specifically, a configuration may be employed in which, for example, (a) the abutment portion 12B is not provided to the tilting member 12, or (b) the abutment portion 12B is provided to a member other than the tilting member 12.

In the above-described embodiment, in the case where no external force F acts on the engagement member 13 when the engagement member 13 is in the engaged position, the stopper 15 and the engagement member 13 are preferably spaced apart from each other. However, the present disclosure is not limited to this. Specifically, the stopper 15 and the engagement member 13 may, for example, constantly contact each other at no contact surface pressure or at a relatively small contact surface pressure.

In the above-described embodiment, the restriction member 16 is provided. However, the present disclosure is not limited to this, and a configuration may be employed in which the restriction member 16 is not provided.

In the above-described embodiment, the restriction member 16 is fixed to the left side frame 7A through the stopper 15 at the first fixing portion 16A in FIG. 2. However, the present disclosure is not limited to this. Specifically, a configuration may be employed in which, for example, the restriction member 16 is fixed to the left side frame 7A at a position other than where the stopper 15 is arranged.

In the above-described embodiment, a front seat of a passenger car is described as an example. However, the seat is not limited to this, and may be a seat for other automobiles or a seat for use in other vehicles, such as railway vehicles, ships, and airplanes.

The present disclosure is not limited to the above-described embodiments as long as the present disclosure conforms to the gist of the disclosure recited in the appended claims. Accordingly, it may be possible to employ a configuration obtained by combining at least two of the above-mentioned embodiments, or a configuration made resistant to an external force directed forward from the rear of the seat by reversing the front and the rear of the configuration of the seat.

What is claimed is:

1. A vehicle seat provided with a seat cushion and a seatback, the seatback being pivotable in forward and rearward directions relative to the seat cushion, the vehicle seat comprising:
    a cushion frame forming a framework of the seat cushion;
    a back frame forming a framework of the seatback and pivotable in the forward and rearward directions relative to the cushion frame;
    a tilting member arranged on a pivot axis of the back frame and configured to transmit to the back frame a pivoting force to cause the back frame to pivot, the tilting member being pivotable independently of the back frame;
    an engagement member coupled to the back frame and displaceable between an engaged position and an unengaged position, the engaged position being a position in which the engagement member is engaged with the tilting member and the unengaged position being a position in which the engagement member is released from engagement, the engagement member allowing transmission of the pivoting force to the back frame when the engagement member is in the engaged position;
    a recliner performing a function of decelerating rotation of an electric motor and transmitting decelerated rotation to the tilting member, the recliner comprising an output gear that moves integrally with the tilting member;
    a fold down spring providing an elastic force to cause the back frame to pivot in the forward direction to a fold down position, wherein an amount of elastic deformation increases when the back frame pivots in the rearward direction;
    a first anchoring member that is fixed to the back frame and to which a first end of the fold down spring is anchored; and
    a second anchoring member to which a second end of the fold down spring is anchored, the second anchoring member moving integrally with the output gear.

2. The vehicle seat according to claim 1, wherein the second anchoring member is fixed to the tilting member.

3. The vehicle seat according to claim 1, wherein the fold down spring is a spiral spring, and wherein an outer peripheral end of the fold down spring is anchored to the first anchoring member, and an inner peripheral end of the fold down spring is anchored to the second anchoring member.

4. The vehicle seat according to claim 3, further comprising:
- a rod arranged on the pivot axis of the back frame and configured to transmit the rotation of the electric motor to the recliner,
- wherein the second anchoring member is a cylindrical member including a through-hole through which the rod penetrates, and
- wherein a gap is arranged between an inner circumferential surface of a portion where the through-hole is formed in the second anchoring member and the rod.

5. A vehicle seat comprising:
- a left side frame;
- a left recliner including an angle position adjusting mechanism;
- a tilting member including an engagement target portion;
- an engagement member including an engagement portion;
- a locking member; and
- a fold down spring,
- wherein the fold down spring is distorted to rotate the left side frame forwards towards a fold down position when the engagement member and the tilting member are not engaged,
- wherein the fold down spring is a coiled band, is located on the right side of the left side frame, and includes:
  - an outer peripheral end contacting a first anchoring member of the left side frame; and
  - an inner peripheral end contacting a first anchor slot of a second anchoring member,
- wherein the second anchoring member includes a through-hole sized to allow a coupling rod to pass through without interference,
- wherein the second anchoring member is attached to the tilting member, and
- wherein the second anchoring member is welded to a left side surface of the tilting member at a first radius relative to the coupling rod.

6. A vehicle seat comprising:
- a left side frame;
- a left recliner including an angle position adjusting mechanism;
- a tilting member including an engagement target portion;
- an engagement member including an engagement portion;
- a locking member;
- a fold down spring;
- a lower arm located to the left of the left recliner, and configured for attachment to a cushion frame; and
- a restriction member,
- wherein the restriction member is located to the left of the tilting member and the engagement member,
- wherein the restriction member restricts leftward movement of the tilting member and the engagement member,
- wherein the restriction member includes a restriction arm that extends downward and to the left of the lower arm,
- wherein the locking member is coupled to the left side frame by a first coupling pin,
- wherein the engagement member is coupled to the left side frame by a second coupling pin, and
- wherein the restriction member is fixed to the first coupling pin with a snap ring.

* * * * *